UNITED STATES PATENT OFFICE.

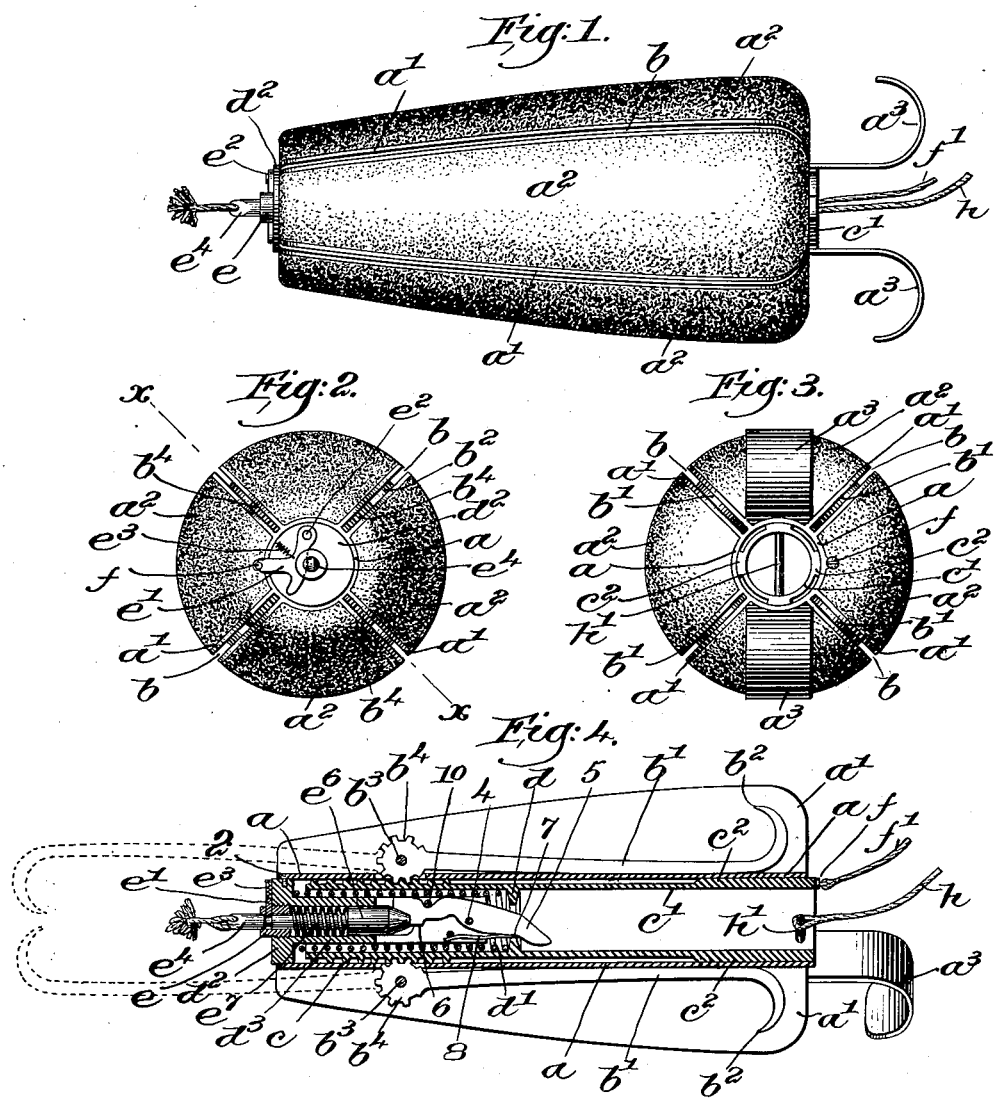

LUCIAN STANEK, OF BOSTON, MASSACHUSETTS.

TRAP.

SPECIFICATION forming part of Letters Patent No. 616,209, dated December 20, 1898.

Application filed January 6, 1898. Serial No. 665,762. (No model.)

*To all whom it may concern:*

Be it known that I, LUCIAN STANEK, of Boston, county of Suffolk, State of Massachusetts, have invented an Improvement in Traps, of which the following description, in connection with the accompanying drawings, is a specification, like letters and numerals on the drawings representing like parts.

This invention has for its object the production of a novel trap for catching fish or animals.

My improved trap consists of a body which when the trap is designed to catch fish may be so made or composed in part of a material having less specific gravity than water, whereby said body will not sink, but will float a little below the surface. This body, howsoever constructed, has pivotally mounted on it a plurality of grabs held normally in their inoperative position and preferably concealed in said body, the actuating mechanism for said grabs, they being under the control of a spring, being at such time held locked, with the spring compressed. Whenever the bait of the trap is pulled, the locking device for the grab-actuating mechanism is released, causing the grabs to be thrown out and forward to grab the animal.

Figure 1, in side elevation, shows the trap in its set or operative position; Fig. 2, a front end elevation thereof; Fig. 3, a rear or right-hand end elevation, and Fig. 4 a longitudinal section in the line $x$ of Fig. 2. Fig. 5 shows the nipple detached and enlarged.

The body of the trap, if for catching fish, should be made of sufficient lightness as not to sink to the bottom and so that it will rest in the water a little below the surface.

The body shown is composed of a thin tube $a$, having four sets of parallel wings $a'$, tapering from the rear toward the small end of the body, as shown in Fig. 4, the spaces between the adjacent sets of wings being filled in with cork or other buoyant material, as at $a^2$, of less specific gravity than water. The rear end of the tube has extended from it, preferably, two finger-pieces $a^3$ of loop-like form. Each of the spaces $b$ between the parallel wings $a'$ receives a grab $b'$, (shown as of hook shape and pointed, as at $b^2$,) each grab being pivoted near its inner end on a pivot $b^3$ and being provided at its inner end with gear-teeth $b^4$. The gear-teeth $b^4$ of the grab are adapted to be engaged by a series of annular teeth $c$ on a sliding rack $c'$, made as a tube, having certain projecting guides $c^2$ to contact with the interior of the tube $a$. The interior of the rack $c'$ has a collar or ring washer $d$ soldered on it, against which bears one end of a spiral spring $d'$, the opposite end of said spring acting against a head-piece $d^2$ of a sleeve $d^3$, said head-piece being shown as held in place at the end of the tube $a$ by a suitable screw 2, said sleeve being surrounded by said spring. A hole at the center of the head $d^2$ is provided with a screw-thread, into which is screwed a nipple $e$. (Shown enlarged and detached in Fig. 5.) The bait-bar $e^4$, having a wedge-shaped enlarged head $e^6$, is inserted into the sleeve $d^3$ and is passed through an actuating-spring $e^7$ inside said sleeve, and the small outer end of the bait-bar protrudes through the head and nipple. The sleeve $d^3$ is slotted longitudinally at its inner end and receives a latch or locking device 5, pivoted at 4 and having a projection 6 and an incline next beyond said projection, against which acts the wedge-shaped end of the bait-bar, as in Fig. 4, when the trap is set, the bait-bar at such time acting on the locking device and keeping a notch 7 near the end of said device in engagement with the inner surface of the ring or washer $d$. A spring 8 acts on said device to move it quickly when the bait-bar and wedge are pulled out by a fish or other animal. A stop 10 limits the movement of said device in the direction in which it is turned by said bait-bar.

In some instances it is desired to set the trap as in Fig. 4 and put it in the water, yet hold it so that it cannot be sprung. To provide for this, the nipple $e$ has a slot 3, which may be entered by a holding device $e'$, pivoted on the head $d^2$ at $e^2$, and when said holding device is pressed into said slot far enough to enter an annular groove of the bait-bar the said bait-bar cannot be pulled out. This holding device may be held in such position by a rod $f$, extended through the body and having connected to its opposite end at the rear end of said body an auxiliary hand-line $f'$. When the rod $f$ is withdrawn from the holding device, a spring $e^3$ acts to instantly remove said holding device from the notch of the bait-bar, leaving it free to be operated.

The hand-line $h$ for handling the trap is connected to a pin $h'$ in the tube $c'$.

To set the trap, the user will put the two fingers of one hand in the loops $a^3$ and will push on the tube $c'$, thus putting the parts in the set position, Fig. 4. The grabs when they operate are thrown over into the dotted-line position, Fig. 4, and the tube $c'$ is thrown out from the rear end of the tube $a$.

This invention is not limited to the exact shape shown for the body or for the grabs, and the trap may be used with but slight modification in shape for catching animals, rodents, &c.

When the trap has been set, if it is not to be used at once the rod $f$ will be pushed in the direction to act on the holding device and keep it in the annular groove of the bait-bar.

After the grabs engage the fish or animal the harder the fish or animal pulls the deeper the grabs engage and the firmer they hold it.

It is intended that the body of the trap when used for fishing shall be sufficiently light weight to sink partially in water, or the body may, if desired, be made of a hollow thin metallic air-tight shell filled or not with cork or other similar material.

Having described my invention, what I claim, and desire to secure by Letters Patent, is—

1. A trap composed of a body having a series of deep grooves; a series of pivoted grabs located in said grooves and normally entirely concealed thereby, a sleeve having a locking device, a sliding rack to set the grabs, and a spring-actuated bait-bar to act on said locking device, combined with a spring to actuate said grabs quickly when the bait device is moved to release said locking device, substantially as described.

2. The body of the trap composed in part of material of less specific gravity than water, and grooved to receive a series of hook-shaped pivoted grabs having at one end teeth; a sliding tube contained in said body and having a series of teeth to engage the teeth of said grabs to put them in set position, means to lock said tube and grabs in set position, and a spring to operate said grabs when the said tube is unlocked, substantially as described.

3. In a trap, a body having a series of grooves, a series of grabs pivoted in said grooves, a tube having teeth to engage and turn said grabs into their set position, a bait-bar; a sleeve in which said bait-bar slides, said sleeve having a locking device held in locked position by said bait-bar and engaging a projection at the interior of said tube; a holding device to engage a notch in said bait-bar and hold it in its set position, and means to control the action of said holding device, substantially as described.

4. The body of the trap having loops to be engaged by the fingers, a series of grabs pivoted on said body and provided with teeth, combined with a tube having rack-teeth to engage the teeth of said grabs, the pushing of said tube into said body acting to put the grabs in set position, substantially as described.

In testimony whereof I have signed my name to this specification in the presence of two subscribing witnesses.

LUCIAN STANEK.

Witnesses:
GEO. W. GREGORY,
EDITH M. STODDARD.